United States Patent
Sato et al.

(10) Patent No.: US 10,301,494 B2
(45) Date of Patent: May 28, 2019

(54) WATER-BASED INKJET INK COMPOSITION FOR PRINTING ON NONABSORBENT BASE MATERIAL

(71) Applicant: SAKATA INX CORPORATION, Osaka (JP)

(72) Inventors: Yoichi Sato, Osaka (JP); Hiroyuki Konishi, Osaka (JP); Kazuki Moriyasu, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 15/550,329

(22) PCT Filed: Feb. 10, 2016

(86) PCT No.: PCT/JP2016/053920
§ 371 (c)(1),
(2) Date: Aug. 10, 2017

(87) PCT Pub. No.: WO2016/136469
PCT Pub. Date: Sep. 1, 2016

(65) Prior Publication Data
US 2018/0037762 A1    Feb. 8, 2018

(30) Foreign Application Priority Data

Feb. 27, 2015  (JP) .................. 2015-039586

(51) Int. Cl.
| | | |
|---|---|---|
| C09D 11/38 | (2014.01) | |
| C09D 11/322 | (2014.01) | |
| B41J 2/01 | (2006.01) | |
| B41M 5/00 | (2006.01) | |
| C09D 11/107 | (2014.01) | |
| C09D 11/326 | (2014.01) | |

(52) U.S. Cl.
CPC .......... C09D 11/38 (2013.01); B41J 2/01 (2013.01); B41M 5/00 (2013.01); C09D 11/107 (2013.01); C09D 11/322 (2013.01); C09D 11/326 (2013.01)

(58) Field of Classification Search
None
See application file for complete search history.

(56) References Cited

U.S. PATENT DOCUMENTS 7,384,991 B2 * 6/2008 Komatsu .............. C03C 17/007
 523/160
2002/0121219 A1  9/2002 Stramel et al.

FOREIGN PATENT DOCUMENTS

| | | |
|---|---|---|
| EP | 1862513 A1 | 12/2007 |
| EP | 1908806 A1 | 4/2008 |
| EP | 2889344 A1 | 7/2015 |
| JP | 2002-080757 A | 3/2002 |
| JP | 2005-097597 A | 4/2005 |
| JP | 2006-117817 A | 5/2006 |
| JP | 2006-274128 A | 10/2006 |
| JP | 2006-282759 A | 10/2006 |
| JP | 2010-089370 A | 4/2010 |
| JP | 2011-137122 A | 7/2011 |
| JP | 2013-129711 A | 7/2013 |
| JP | 2014-227440 A | 12/2014 |
| JP | 2015-229696 A | 12/2015 |

OTHER PUBLICATIONS

International Preliminary Report on Patentability and Written Opinion of the International Searching Authority in PCT Application No. PCT/JP2016/053920, dated Aug. 29, 2017.
Extended European Search Report dated Jul. 27, 2018 in European application No. 16755216.5, in 6 pgs.
International Search Report dated by Japan Patent Office on Apr. 26, 20176 in the corresponding PCT application No. PCT/JP2016/053920.

\* cited by examiner

*Primary Examiner* — Vu A Nguyen
(74) *Attorney, Agent, or Firm* — Knobbe, Martens, Olson & Bear, LLP

(57) ABSTRACT

A water-based inkjet ink composition for printing on non-absorbent base material contains alkali-soluble resin-coated pigment, basic compound, water-soluble organic solvent, surface-active agent A, and surface-active agent B. Surface-active agent A is an acetylene diol compound represented by the following formula:

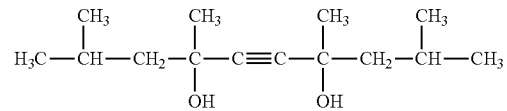

Surface-active agent B is a compound with an HLB value of 4 to 9 obtained by adding an ethylene oxide to an acetylene diol compound. The content of surface-active agent A in the water-based inkjet ink composition is 0.1 to 1 percent by mass, and the content of surface-active agent B in the water-based inkjet ink composition is 0.4 to 2.5 percent by mass. The static surface tension of the ink composition is 27 to 32 mN/m.

14 Claims, No Drawings

WATER-BASED INKJET INK COMPOSITION FOR PRINTING ON NONABSORBENT BASE MATERIAL

This application is the U.S. National Phase under 35 U.S.C. § 371 of International Application PCT/JP2016/053920, filed Feb. 10, 2016, which claims priority to Japanese Patent Application No. 2015-039586, filed Feb. 27, 2015. The International Application was published under PCT Article 21(2) in a language other than English.

TECHNICAL FIELD

The present invention relates to a water-based inkjet ink composition for printing on nonabsorbent base material, which offers excellent preservation stability, as well as excellent dot expandability and solid area uniformity even when the ink composition is printed on nonabsorbent media such as coated paper or polyvinyl chloride sheets.

BACKGROUND ART

Inkjet printing is a printing/recording method whereby droplets of ink are directly discharged from very fine nozzles and deposited onto a base material for printing/recording to obtain text and images.

The water-based inkjet printing method has traditionally been considered not suitable for manufacturing a large amount of printed matter since printing takes a long time due to a scanning-type print head, and water-based media dry slowly.

On the other hand, advantages include not requiring a plating process unlike other standard printing methods, but requiring only equipment of very simple configuration, even for electrophotographic printing; as a result, this method is primarily used for personal and home printing.

In light of the above, the inkjet printing method should present sufficient value to remain competitive against other printing methods, even for industrial applications such as printing in offices and commercial printing, so long as the aforementioned problems of printing time, drying time, etc., are resolved. For this reason, technologies to increase printing speed and apply low-cost printing paper have been actively studied lately, from both the printing equipment side and the ink side, so that the inkjet printing method can be used in industrial applications.

In industrial applications, the use of not only low-cost plain paper, normal offset paper, and other types of uncoated paper but also coated paper, polyvinyl chloride sheets, and other nonabsorbent media, has been studied as base materials for printing. These media are lower in surface tension compared to other media such as uncoated paper, and therefore the contact angle of ink droplets with the media increases, which means that the droplets of ink, upon landing on the media, do not wet and spread over the media easily, and the dots do not expand fully; as a result, the printed matter lacks richness in density.

Also, water-based inks tend to wet and spread over nonabsorbent media in a nonuniform matter, which causes mottled patterns in solid image areas that should have a uniform density.

These problems reduce the value of printed matter, and thus countermeasures have been sought. In addition, inks for inkjet printing must also have the properties traditionally required by the inkjet printing method, such as preservation stability, discharge stability of the ink to be discharged stably without clogging the nozzle, and droplet flight property, among others.

One technology to improve the wettability of water-based inks on nonabsorbent media is to introduce surface-active agents into the inks. In particular, acetylene diol compound-based surface-active agents demonstrate excellent property to lower the surface tension of water-based inkjet ink compositions and allow liquid ink films to be formed uniformly on media compared to other types of surface-active agents. Examples of this technology are cited in Patent Literatures 1 to 4.

However, prior art such as the above cannot achieve enough dot expandability and solid area uniformity to meet the required level of printing quality which has been improved further in recent years.

Also, while Patent Literatures 5 to 7 cite examples of a water-based inkjet ink composition combining two types of acetylene diol compound-based surface-active agents for use on such base materials as plain paper, glossy paper, and other absorbent media, printing these ink compositions on nonabsorbent media does not achieve enough dot expandability and solid area uniformity to meet the required level of printing quality which has been improved further in recent years.

Also, while they are highly effective in lowering the surface tension of water-based inkjet ink compositions, acetylene diol compound-based surface-active agents have a strong tendency to separate from water-based inkjet ink compositions, and this may negatively affect preservation stability.

As described above, although use of coated paper, polyvinyl chloride sheets, and other nonabsorbent media under the water-based inkjet printing method is being studied, the reality is that it is difficult to obtain water-based inkjet ink compositions offering excellent dot expandability, excellent solid area uniformity, and good preservation stability.

Background Art Literature

Patent Literature

Patent Literature 1: Japanese Patent Laid-open No. 2010-089370
Patent Literature 2: Japanese Patent Laid-open No. 2013-129711
Patent Literature 3 Japanese Patent Laid-open No. 2011-137122
Patent Literature 4 Japanese Patent Laid-open No. 2014-227440
Patent Literature 5 Japanese Patent Laid-open No. 2002-080757
Patent Literature 6 Japanese Patent Laid-open No. 2006-282759
Patent Literature 7 Japanese Patent Laid-open No. 2006-274128

SUMMARY OF THE INVENTION

Problems to be Solved by the Invention

An object of the present invention is to provide a water-based inkjet ink composition for printing on nonabsorbent base material, which offers excellent preservation stability, as well as excellent dot expandability, and solid area uniformity even when the ink composition is printed on nonabsorbent media (coated paper, polyvinyl chloride sheets, etc.).

Means for Solving the Problems

As a result of studying in earnest to achieve the aforementioned object, the inventors of the present invention invented a water-based inkjet ink composition, the scope of which is described below:
(1) A water-based inkjet ink composition for printing on nonabsorbent base material that contains alkali-soluble resin-coated pigment, basic compound, water-soluble organic solvent, surface-active agent A, and surface-active agent B, wherein said water-based inkjet ink composition for printing on nonabsorbent base material is characterized in that surface-active agent A is an acetylene diol compound represented by Formula (1), the content of surface-active agent A in the water-based inkjet ink composition is 0.1 to 1 percent by mass, surface-active agent B is a compound with an HLB value of 4 to 9 obtained by adding an ethylene oxide to an acetylene diol compound, the content of surface-active agent B in the water-based inkjet ink composition is 0.4 to 2.5 percent by mass, and the static surface tension of the ink composition is 27 to 32 mN/m.

Formula (1)

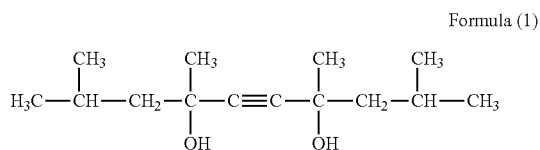 [SMILES: CC(C)CC(C)(O)C#CC(C)(O)CC(C)C]

(2) The water-based inkjet ink composition for printing on nonabsorbent base material according to (1), characterized in that the content of surface-active agent B in the water-based inkjet ink composition is 0.8 to 2.5 percent by mass, and the ratio of the content of surface-active agent A and that of surface-active agent B is in a range of 1.5 to 10 as calculated by "Content of surface-active agent B/Content of surface-active agent A."
(3) The water-based inkjet ink composition for printing on nonabsorbent base material according to (1) or (2), characterized in that it contains a resin emulsion of which the glass transition temperature is 20° C. or lower.
(4) The water-based inkjet ink composition for printing on nonabsorbent base material according to any one of (1) to (3), characterized in that the acid value of the alkali-soluble resin used for the alkali-soluble resin-coated pigment is 40 to 300 mgKOH/g, and the ink contains a basic compound needed to neutralize 50 to 90% of the acid groups in the resin.
(5) The water-based inkjet ink composition for printing on nonabsorbent base material according to any one of (1) to (4), characterized in that the content of the water-soluble organic solvent in the water-based inkjet ink composition for printing on nonabsorbent base material is 20 to 40 percent by mass.

Effects of the Invention

According to the water-based inkjet ink composition for printing on nonabsorbent base material as proposed by the present invention, marked effects such as excellent preservation stability of the ink composition itself, as well as excellent dot expandability and excellent solid area uniformity even when the ink composition is printed on nonabsorbent media (coated paper, polyvinyl chloride sheets, etc.), can be demonstrated.

MODE FOR CARRYING OUT THE INVENTION

The inventors of the present invention developed a new water-based inkjet ink composition for printing on nonabsorbent base material, particularly by blending an acetylene diol compound which is surface-active agent A as represented by Formula (1), and a compound with an HLB value of 4 to 9 obtained by adding an ethylene oxide to an acetylene diol compound which is surface-active agent B, by specified amounts and at a specified ratio, into a water-based inkjet ink composition for printing on nonabsorbent base material.

Formula (1)

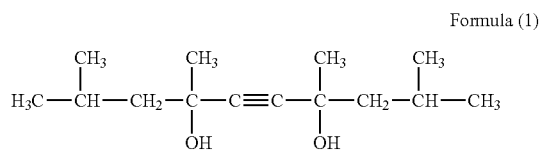 [SMILES: CC(C)CC(C)(O)C#CC(C)(O)CC(C)C]

According to the present invention, once the ink lands on the media surface during printing, a lower surface tension of the ink due to the acetylene diol compound represented by Formula (1) manifests in the form of smaller contact angles of the droplets of ink with the media surface, which promotes wetting of the media surface and causes the dots to expand sufficiently. Furthermore, the compound with an HLB value of 4 to 9, obtained by adding an ethylene oxide to an acetylene diol compound, causes the droplets of ink to wet and spread over the media uniformly to form uniformly filled solid image areas.

Furthermore, the compound with an HLB value of 4 to 9 obtained by adding an ethylene oxide to an acetylene diol compound functions to make the acetylene diol compound-based surface-active agent with a lower HLB value compatible with the water-based inkjet ink composition for printing on nonabsorbent base material, and thereby prevents the two from separating.

"HLB" above stands for "Hydrophile-Lipophile Balance," which is a word used in the field of surface-active agents and refers to a balance between the hydrophilic parts and hydrophobic parts of molecules. The HLB value ranges from 0 to 20, and the greater the value of HLB is, the higher hydrophilicity is.

Under the present invention, the HLB value defined by Griffin's formula below is used.

HLB=20×Total sum of formula weights of hydrophilic parts in the surface-active agent/Molecular weight of the surface-active agent　　　[Griffin's Formula]

The water-based inkjet ink composition for printing on nonabsorbent base material as proposed by the present invention is explained specifically below regarding each of its components.
(Alkali-Soluble Resin-Coated Pigment)

As for the alkali-soluble resin-coated pigment, a dispersion is obtained by dispersing a pigment in a water-based solution in which an alkali-soluble resin has been dissolved in the presence of a basic compound, and then the dispersion is subjected to the acid precipitation method, the ion exchange means described in the Republication of Patent Application Laid-open No. WO2005/116147, the phase-transfer emulsification method, or the like, to make the alkali-soluble resin precipitated onto the pigment surface, after which the obtained precipitates are filtered out, washed with water, and then dried, if necessary, to obtain an alkali-soluble resin-coated pigment. The alkali-soluble resin-coated pigment is used in such a way that a basic compound needed to neutralize some, or preferably 50 to 90 percent, or more preferably 60 to 80 percent, of the acid groups of the anionic groups in the alkali-soluble resin-coated pigment is blended into the ink to neutralize the resin, after which any of various dispersion machines is used to disperse the neutralized resin in a water-based medium again. This adds excellent dispersion stability to the ink.

Pigment

Pigments used for the aforementioned alkali-soluble resin-coated pigment include various inorganic pigments and organic pigments that are generally used for inkjet inks. To be specific, the inorganic pigments include titanium oxide, red iron oxide, antimony red, cadmium yellow, cobalt blue, ultramarine blue, Prussian blue, carbon black, graphite, and other chromatic pigments (including coloring pigments having white, black, and other achromatic colors), calcium carbonate, kaolin, clay, barium sulfate, aluminum hydroxide, talc, and other extender pigments. The organic pigments include soluble azo pigments, insoluble azo pigments, azo lake pigments, condensed azo pigments, copper phthalocyanine pigments, condensed polycyclic pigments, etc. Any of the foregoing may be used alone, or two or more types of them may be combined.

Also, particularly from the viewpoint of allowing expression of vivid hue, preferably the aforementioned pigment is, more specifically: a red pigment such as C. I. Pigment Red 5, 7, 12, 57:1, 122, 146, 202, 242, 282, or the like; a blue pigment such as C. I. Pigment Blue 1, 2, 15:3, 15:4, 16, 17, 60, or the like; a violet pigment such as C. I. Pigment Violet 19, 23, or the like; a yellow pigment such as C. I. Pigment Yellow 12, 13, 14, 17, 74, 83, 93, 128, 139, 151, 154, 155, 180, 185, 213, or the like; C. I. Pigment Black 7 (carbon black); a green pigment such as C. I. Pigment Green 7, 36, or the like; or an orange pigment such as C. I. Pigment Orange 34, 71, or the like.

Alkali-Soluble Resin

For the alkali-soluble resin used for the alkali-soluble resin-coated pigment, any copolymer resin which is used in normal inks and paints for dispersing a pigment or pigments and can be dissolved in a water-based medium in the presence of a basic compound, can be used.

For this alkali-soluble resin, a copolymer constituted by a monomer containing a carboxyl group and a monomer containing a hydrophobic group for improved absorptivity with respect to the pigment, preferably, a monomer containing an alkyl group and aromatic cyclic hydrocarbon group of carbon number 12 or more but no more than 24, or a copolymer obtained by causing any such monomer to react together with another polymerizable monomer as necessary, may be used.

The monomer containing a carboxyl group may be, for example, acrylic acid, methacrylic acid, crotonic acid, itaconic acid, maleic acid, fumaric acid, 2-carboxy ethyl (meth)acrylate, 2-carboxy propyl (meth)acrylate, maleic acid anhydride, maleic monoalkyl ester, citraconic acid, citraconic acid anhydride, monoalkyl ester citraconate, or the like.

Also, the monomer containing a hydrophobic group for improved absorptivity with respect to the pigment may be, for example: a monomer containing a long-chain alkyl group such as an alkyl ester of (meth)acrylic acid or other radical-polymerizable unsaturated carbonic acid of carbon number 8 or more (for example, 2-ethyl hexyl (meth)acrylate, octyl (meth)acrylate, lauryl (meth)acrylate, stearyl (meth)acrylate, 2-hydroxy stearyl (meth)acrylate, etc.), alkyl vinyl ether of carbon number 8 or more (for example, dodecyl vinyl ether, etc.), vinyl ester of fatty acid of carbon number 8 or more (for example, vinyl 2-ethyl hexanoate, vinyl laurate, vinyl stearate, etc.); a monomer having an alicyclic hydrocarbon group such as cyclohexyl (meth)acrylate and the like; and a monomer having an aromatic hydrocarbon such as benzyl (meth)acrylate, styrene, α-styrene, vinyl toluene, or other styrene monomer, preferably a monomer containing an alkyl group and aromatic cyclic hydrocarbon group of carbon number 12 and more but no more than 24.

Also, the other polymerizable monomer to be used as necessary may be methyl (meth)acrylate, ethyl (meth)acrylate, propyl (meth)acrylate, isopropyl (meth)acrylate, butyl (meth)acrylate, hexyl (meth)acrylate or other (meth)acrylate, hydroxy ethyl (meth)acrylate, acrylamide, N-methylol acrylamide, or the like.

The acid value of the alkali-soluble resin is preferably 40 to 300 mgKOH/g, or preferably 70 to 250 mgKOH/g. If the acid value of the alkali-soluble resin is lower than the aforementioned range, dispersion stability of the obtained alkali-soluble resin-coated pigment may drop in the water-based dispersant; if the acid value is higher than the aforementioned range, on the other hand, hydrophilicity becomes too high, and storage stability and water resistance may drop as a result.

As for the molecular weight of the alkali-soluble resin, normally the weight-averaged molecular weight is preferably 3,000 to 200,000, or more preferably 7,000 to 100,000. If the weight-averaged molecular weight of the alkali-soluble resin is less than 3,000, dispersion stability of the pigment or the scratch resistance of the obtained printed matter tends to drop; if the weight-averaged molecular weight exceeds 200,000, on the other hand, viscosity increases, which is not desirable.

<Acid Value>

The acid value here is a theoretical acid value corresponding to the amount of potassium hydroxide in milligrams theoretically needed to neutralize 1 gram of alkali-soluble resin, as arithmetically calculated based on the monomer composition used to synthesize the alkali-soluble resin.

<Weight-Averaged Molecular Weight>

The weight-averaged molecular weight can be measured according to gel permeation chromatography (GPC). For example, chromatography can be performed using Waters 2690 (manufactured by Waters) as a GPC system, and PL Gel 5μ MIXED-D (manufactured by Polymer Laboratories) as a column, to obtain a polystyrene-equivalent weight-averaged molecular weight.

(Basic Compound)

The basic compound may be sodium hydroxide, potassium hydroxide, or other inorganic basic compound; or ammonium, methyl amine, ethyl amine, monoethanol amine, N,N-dimethyl ethanol amine, N,N-diethyl ethanol amine, N,N-dibutyl ethanol amine, diethanol amine, N-methyl diethanol amine, triethanol amine, morpholine, N-methyl morpholine, N-ethyl morpholine, or other organic basic compound; or the like. Any of these basic compounds may be used alone, or two or more types of them may be mixed. Among the basic compounds, monoethanol amine, N,N-dimethyl ethanol amine, N,N-diethyl ethanol amine, N,N-dibutyl ethanol amine, diethanol amine, N-methyl diethanol amine, triethanol amine, or other alkanol amine can be used favorably.

(Water-Soluble Organic Solvent)

The water-soluble organic solvent used in the water-based inkjet ink composition for printing on nonabsorbent base material as proposed by the present invention is used as a water-based medium together with water.

For the water, deionized water or distilled water from which metal ions, etc., have been removed is preferred.

Also, by blending a water-soluble organic solvent, more superior inkjet printability may be added in the form of preservation stability, discharge stability, ink flight property, etc. Such water-soluble organic solvent may be, for example, any of monoalcohols, polyalcohols, lower alkyl ethers of polyalcohols, ketones, ethers, esters, nitrogen-containing compounds, or the like. Any of the foregoing may be used alone, or two or more types of them may be combined.

Specific examples of the monoalcohols include methanol, ethanol, n-propanol, n-butanol, n-pentanol, n-hexanol, n-heptanol, n-octanol, n-nonyl alcohol, n-decanol, isomers thereof, cyclopentanol, cyclohexanol, etc., of which alcohols containing alkyl groups of carbon number 1 to 6 are preferred.

Specific examples of the polyalcohols include ethylene glycol, propylene glycol, 1,3-butylene glycol, 1,4-butylene glycol, 1,2-pentane diol, 1,5-pentane diol, neopentyl glycol, 1,2-hexane diol, 1,6-hexane diol, 1,2-cyclohexane diol, heptane diol, 1,8-octane diol, 1,9-nonane diol, 1,10-decane diol, glycerin, pentaerythritol, diethylene glycol, dipropylene glycol, triethylene glycol, tetraethylene glycol, polyethylene glycol, polypropylene glycol, thiodiglycol, etc.

Specific examples of the lower alkyl ethers of polyalcohols include ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propyplene glycol monopropyl ether, propylene glycol monobutyl ether, diethylene glycol monomethyl ether, diethylene glycol monoethyl ether, dipropylene glycol mono-n-propyl ether, dipropylene glycol mono-n-butyl ether, etc.

Specific examples of the ketones include acetone, methyl ethyl ketone, methyl butyl ketone, methyl isobutyl ketone, diisopropyl ketone, cyclopentanone, cyclohexanone, etc.

Specific examples of the ethers include isopropyl ether, n-butyl ether, tetrahydrofuran, tetrahydropyrane, 1,4-dioxane, etc.

Examples of the esters include propylene carbonate, methyl acetate, ethyl acetate, propyl acetate, isopropyl acetate, butyl acetate, isobutyl acetate, amyl acetate, ethyl lactate, ethyl butyrate, dibutyl phthalate, dioctyl phthalate, and s-caprolactone, s-caprolactam, and other cyclic esters, etc.

Examples of the nitrogen-containing compounds include urea, pyrrolidone, N-methyl-2-pyrrolidone, octyl pyrrolidone, etc.

Preferably the content of the water-soluble organic solvent in the water-based inkjet ink composition for printing on nonabsorbent base material is 20 to 40 percent by mass.

(Surface-Active Agent A)

For surface-active agent A under the present invention, an acetylene glycol compound represented by Formula (1) may be used.

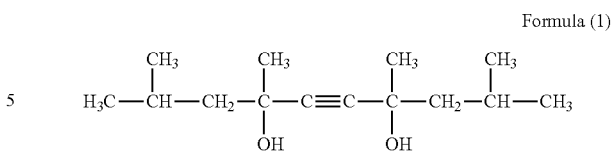

Formula (1)

Specific examples include Surfinol 104E, Surfinol 104H, Surfinol 104A, Surfinol 104BC, Surfinol 104DPM, Surfinol 104PA, Surfinol 104PG50 by Air Products and Chemicals, etc.

The content of surface-active agent A in the water-based inkjet ink composition is preferably 0.1 to 1 percent by mass, or more preferably 0.2 to 0.7 percent by mass. If the content of surface-active agent A is less than 0.1 percent by mass, the dot expandability tends to deteriorate; if the content exceeds 1 percent by mass, on the other hand, the preservation stability of the ink tends to deteriorate, which is not desirable.

(Surface-Active Agent B)

For surface-active agent B under the present invention, a compound with an HLB value of 4 to 9 obtained by adding an ethylene oxide to an acetylene diol compound may be used, for example. Specific examples include Surfinol 420, Surfinol 440 by Air Products and Chemicals, etc.

The content of surface-active agent B in the water-based inkjet ink composition is preferably 0.4 to 2.5 percent by mass, or more preferably 0.8 to 2.5 percent by mass. If the content of surface-active agent B is less than 0.4 percent by mass, preservation stability of the ink and solid area uniformity of the printed matter tend to worsen; if the content exceeds 2.5 percent by mass, on the other hand, preservation stability of the ink tends to deteriorate, which is not desirable.

From the viewpoints of dot expandability, solid area uniformity, and preservation stability of the water-based inkjet ink composition for printing on nonabsorbent base material, preferably the ratio of the content of surface-active agent A and that of surface-active agent B is in a range of 1.5 to 10 as calculated by "Content of surface-active agent B/Content of surface-active agent A."

(Resin Emulsion)

The resin emulsion may be an acrylic resin emulsion, styrene-acrylic resin emulsion, polyester resin emulsion, polyurethane resin emulsion, polyvinyl acetate resin emulsion, polyvinyl chloride resin emulsion, polybutadiene resin emulsion, or polyethylene resin emulsion of which the glass transition temperature is 20° C. or lower, or the like. Among the types of resin emulsion, a styrene-acrylic resin emulsion is preferred as it achieves excellent appearance and various resistance characteristics of the obtained printed matter.

Use of a resin emulsion of which the glass transition temperature is 20° C. or higher is not desirable because drying property of the film and its adhesion with the non-absorbent base material drop.

The content of the resin emulsion in the water-based inkjet ink composition for printing on nonabsorbent base material is preferably 1 to 10 percent by mass, or more preferably 2 to 5 percent by mass, based on the solids content.

If the content of the resin emulsion is less than 1 percent by mass based on the solids content, the appearance and various resistance characteristics of the obtained printed matter tend to drop; if the content exceeds 10 percent by mass, on the other and, the discharge of the ink tends to become unstable, which is not desirable.

<Glass Transition Temperature>

The glass transition temperature here is a theoretical glass transition temperature obtained by Wood's equation below:

$$1/Tg = W1/Tg1 + W2/Tg2 + W3/Tg3 + \ldots + Wx/Tgx \quad \text{Wood's equation:}$$

(In the equation, Tg1 to Tgx indicate the glass transition temperatures of the homopolymers of monomers 1, 2, 3 . . . . x constituting the alkali-soluble resin, respectively; W1 to Wx indicate the polymerization ratios of monomers 1, 2, 3, . . . x, respectively; and Tg indicates a theoretical glass transition temperature. It should be noted that, in Wood's equation, the glass transition temperature is an absolute temperature.)

(Additives)

Further, any known pigment dispersant, antifungal agent, anticorrosive agent, thickening agent, antioxidant, UV absorbent, shelf-life improving agent, defoaming agent, PH adjusting agent, or any other additive may be added, according to the purpose, to the water-based inkjet ink composition for printing on nonabsorbent base material as proposed by the present invention.

[Manufacturing Method of Water-Based Inkjet Ink Composition for Printing on Nonabsorbent Base Material]

Methods for manufacturing a water-based inkjet ink composition for printing on nonabsorbent base material using the aforementioned constituents include one whereby a pigment, a water-based resin varnish prepared by dissolving an alkali-soluble resin into water in the presence of a basic compound, and a pigment dispersant, etc., as necessary, are mixed. Then, the pigment is dispersed using any of various dispersion machines such as ball mill, Attritor, roll mill, sand mill, or agitator mill, after which the alkali-soluble resin is precipitated onto the pigment surface using the acid precipitation method, the ion exchange means described in the Republication of Patent Application Laid-open No. WO2005/116147, the phase-transfer emulsification method, or the like. Next, the pigment with the alkali-soluble resin precipitated on its surface is neutralized with a basic compound and then dispersed again in water using any of various dispersion machines (high-speed agitator, etc.), and the remaining ingredients are added thereto, to prepare a water-based inkjet ink composition for printing on nonabsorbent base material.

With water-based inkjet ink composition for printing on nonabsorbent base material thus obtained, as proposed by the present invention, the initial viscosity, after manufacturing, is in a range of 2.0 to 10.0 mmPa·s, or preferably 3.0 to 7.0 mmPa·s, and the static surface tension is in a range of 27 to 32 mN/m.

[Printing Method]

Next, how to print using the water-based inkjet ink composition for printing on nonabsorbent base material as proposed by the present invention is explained.

For the printing media used with the water-based inkjet ink composition for printing on nonabsorbent base material as proposed by the present invention, such nonabsorbent base materials as art paper, dedicated inkjet paper, inkjet glossy paper and other types of coated paper, polyvinyl chloride sheets, and other plastic base materials may be used.

It should be noted that the present invention can also be used with plain paper, offset paper, and other types of uncoated paper.

It is also possible, for example, to store the aforementioned water-based inkjet ink composition for printing on nonabsorbent base material as proposed by the present invention in an ink cartridge, set the ink cartridge in an inkjet recording device of single-pass method, etc., and inject the ink from a nozzle onto any of the aforementioned base materials for printing, to perform inkjet printing.

EXAMPLES

The present invention is explained in greater detail below by citing examples. It should be noted, however, that the present invention is not limited to these examples. Unless otherwise specified, "%" means "percent by mass."

<Water-Based Resin Varnish A>

Twenty-five parts by mass of an acrylate/lauryl acrylate/benzyl methacrylate/styrene copolymer of which the glass transition temperature is 40° C., weight-averaged molecular weight is 30,000, and acid value is 185 mgKOH/g, was dissolved in a mixed solution containing 3.9 parts by mass of potassium hydroxide and 71.1 parts by mass of water, to obtain water-based resin varnish A with a solids content of 25%.

<Water-Based Resin Varnish B>

Twenty-five parts by mass of an acrylate/lauryl acrylate/benzyl methacrylate/styrene copolymer of which the glass transition temperature is 40° C., weight-averaged molecular weight is 30,000, and acid value is 150 mgKOH/g, was dissolved in a mixed solution containing 3.2 parts by mass of potassium hydroxide and 71.8 parts by mass of water, to obtain water-based resin varnish B with a solids content of 25%.

<Preparation of Water-Based Black Ink Base 1>

Forty-eight parts by mass of water was added to, and mixed together with, 32 parts by mass of water-based resin varnish A mentioned above, to prepare a pigment-dispersing resin varnish. Twenty parts by mass of a carbon black (Printex 90 manufactured by Degussa (current Orion Engineered Carbons; the same applies hereinafter)) was further added to, and mixed under agitation with, this varnish, after which the mixture was kneaded using a wet circulation mill, to obtain water-based black ink base 1.

<Preparation of Water-Based Black Ink Base 2>

Forty-eight parts by mass of water was added to, and mixed together with, 32 parts by mass of water-based resin varnish B mentioned above, to prepare a pigment-dispersing resin varnish. Twenty parts by mass of a carbon black (Printex 90 manufactured by Degussa) was further added to, and mixed under agitation with, this varnish, after which the mixture was kneaded using a wet circulation mill, to obtain water-based black ink base 2.

<Preparation of Water-Based Yellow Ink Base>

Forty-eight parts by mass of water was added to, and mixed with 32 parts by mass of water-based resin varnish A mentioned above, to prepare a pigment-dispersing resin varnish. Twenty parts by mass of a yellow pigment (NOVA Palm Yellow 4G01 manufactured by Clariant) was further added to, and mixed under agitation with, this varnish, after which the mixture was kneaded using a wet circulation mill, to obtain a water-based yellow ink base.

<Preparation of Water-Based Magenta Ink Base>

Forty-eight parts by mass of water was added to, and mixed with 32 parts by mass of water-based resin varnish A mentioned above, to prepare a pigment-dispersing resin varnish. Twenty parts by mass of a magenta pigment (Inkjet Magenta E5B02 manufactured by Clariant) was further added to, and mixed under agitation with, this varnish, after which the mixture was kneaded using a wet circulation mill, to obtain a water-based magenta ink base.

<Preparation of Water-Based Cyan Ink Base>

Forty-eight parts by mass of water was added to, and mixed with 32 parts by mass of water-based resin varnish A mentioned above, to prepare a pigment-dispersing resin varnish. Twenty parts by mass of a cyan pigment (Heliogen Blue L7101F manufactured by BASF) was further added to, and mixed under agitation with, this varnish, after which the mixture was kneaded using a wet circulation mill, to obtain a water-based cyan ink base.

<Surface-Active Agent A>

Surfinol 104PG50 (solids content of 50%, HLB value of 4, manufactured by Air Products and Chemicals)

<Surface-Active Agent B>

Surfinol 420 (solids content of 100%, HLB value of 4, manufactured by Air Products and Chemicals)

Surfinol 440 (solids content of 100%, HLB value of 8, manufactured by Air Products and Chemicals)

<Other Surface-Active Agent>

Surfinol 465 (solids content of 100%, HLB value of 13 to 14, manufactured by Air Products and Chemicals)

<Resin Emulsion>

NeoCryl A-1092 (solids content of 48.5%, styrene-acrylic emulsion, manufactured by DSM NeoResins, glass transition temperature 6° C.)

<Water-Based Inkjet Ink Compositions in Examples 1 to 10 and Comparative Examples 1 to 6>

(Manufacturing of Alkali-Soluble Resin-Coated Pigments)

Each of the aforementioned water-based inkjet ink bases of respective colors was diluted with water to a pigment concentration of 5%, after which a cation-exchange resin (DOWEX MONOSPHERE (H) 650C, manufactured by Dow Chemical) was added to the dilution by 5%, and the dilution was agitated. Then, the solution was deionized to a pH value of less than 4, to obtain each resin-coated pigment. Thereafter, the ion-exchange resin was filtered through a mesh and then suction-filtered, to obtain a hydrous cake containing each resin-coated pigment (solids content of 25%).

(Manufacturing of Water-Based Pigment Dispersions)

To the aforementioned hydrous cake containing each resin-coated pigment, enough sodium hydroxide to neutralize 80% of the acid value of the alkali-soluble resin in each resin-coated pigment, and enough water to achieve a pigment concentration of 12%, were added, after which the mixture was agitated using a high-pressure emulsifier-disperser: Gaulin Homogenizer (manufactured by A. P. V. Gaulin Ink), to obtain each water-based pigment dispersion.

(Manufacturing of Water-Based Inkjet Ink Compositions)

Next, the aforementioned water-based pigment dispersions were each mixed under agitation with resin emulsion, propylene glycol, surface-active agent A, surface-active agent B, and water, at the percentages by mass in Table 1, to obtain the water-based inkjet ink compositions in Examples 1 to 10 and Comparative Examples 1 to 6 shown in Table 1.

<Printing Evaluation of Water-Based Inkjet Ink Compositions>

The water-based inkjet ink compositions were evaluated using the methods below, the results of which are shown in Table 1.

(Preservation Stability)

The water-based inkjet ink compositions in Examples 1 to 10 and Comparative Examples 1 to 6 were each filled in a glass vial and laid still at 23° C. for seven days, after which the water-based inkjet ink compositions were observed and evaluated for preservation stability based the condition of separation.

Evaluation Standards

◯: The liquid phase has not separated, and the composition is uniform.

Δ: The liquid phase has separated slightly.

x: The liquid phase has separated, and the composition is nonuniform.

(Dot Expandability)

The water-based inkjet ink compositions in Examples 1 to 10 and Comparative Examples 1 to 6 were each dropped by 2 μL onto an OK top-coated paper (manufactured by Oji Paper) and evaluated for dot expandability by measuring the contact angle at 23° C. using a contact angle gauge DM701 (manufactured by Kyowa Interface Science).

Evaluation Standards

◯: The contact angle is no more than 14°.

Δ: The contact angle exceeds 14° but is no more than 18°.

x: The contact angle exceeds 18°.

(Solid Area Uniformity)

The water-based inkjet ink compositions in Examples 1 to 10 and Comparative Examples 1 to 6 were each spread onto an OK top-coated paper (manufactured by Oji Paper) using a 0.1-mm wire bar and evaluated for uniformity of the color-spread surface.

Evaluation Standards

◯: The color-spread surface is uniform.

Δ: The color-spread surface is somewhat nonuniform.

x: The color-spread surface is non-uniform, and mottled patterns are recognized.

Based on the results of Examples 1 to 10, the water-based inkjet ink compositions according to the present invention exhibited good preservation stability, dot expandability, and solid area uniformity, and these properties were stable without being affected by the type of pigment.

On the other hand, the ink composition in Comparative Example 1, where both surface-active agents A and B were blended by amounts greater than the ranges specified under the present invention, resulted in poor preservation stability and dot expandability. Also, Comparative Example 2, where surface-active agent A was blended by an amount greater than the range specified under the present invention, while surface-active agent B was not blended, resulted in poor preservation stability and solid area uniformity. Furthermore, Comparative Example 3, where surface-active agent A was not blended, while surface-active agent B was blended, resulted in poor preservation stability, dot expandability, and solid area uniformity. In addition, Comparative Example 4, where neither surface-active agent A nor B was blended, but Surfinol 465 was used as a surface-active agent, exhibited insufficient dot expandability and solid area uniformity. Furthermore, Comparative Examples 5 and 6, where Surfinol 465 and surface-active agent A or B were used, resulted in poor preservation stability and dot expandability.

TABLE 1

| | | Examples | | | | | | | | | | Comparative Examples | | | | | |
| --- | --- | --- | --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 1 | 2 | 3 | 4 | 5 | 6 |
| Pigment dispersion | Pigment dispersion 1 (Black base 1) | 34 | 34 | 34 | 34 | 34 | 34 | — | — | — | — | 34 | 34 | 34 | 34 | 34 | 34 |
| | Pigment dispersion 2 (Black base 2) | — | — | — | — | — | — | 34 | — | — | — | — | — | — | — | — | — |
| | Pigment dispersion 3 (Yellow base) | — | — | — | — | — | — | — | 34 | — | — | — | — | — | — | — | — |

TABLE 1-continued

| | | Examples | | | | | | | | | | Comparative Examples | | | | | |
|---|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 | 6 |
| | Pigment dispersion 4 (Magenta base) | — | — | — | — | — | — | — | — | 34 | — | — | — | — | — | — | — |
| | Pigment dispersion 5 (Cyan base) | — | — | — | — | — | — | — | — | — | 34 | — | — | — | — | — | — |
| | Resin emulsion | 7 | 7 | 7 | 7 | 7 | — | 7 | 7 | 7 | 7 | 7 | 7 | 7 | 7 | 7 | 7 |
| Surface-active agent A | Surfinol 104PG50 (solids content of 50%) | 0.5 | 0.5 | 1.0 | 1.0 | 0.4 | 0.5 | 0.5 | 0.5 | 0.5 | 0.5 | 1.5 | 2.0 | — | — | — | 1.0 |
| Surface-active agent B | Surfinol 420 | 1.5 | — | — | — | — | — | — | — | — | — | — | — | — | — | — | — |
| | Surfinol 440 | — | 1.5 | 1.0 | 2.0 | 0.8 | 1.5 | 1.5 | 1.5 | 1.5 | 1.5 | 3.0 | — | 2.0 | — | 1.0 | — |
| Surface-active agent | Surfinol 465 (HLB value of 13 to 14) | — | — | — | — | — | — | — | — | — | — | — | — | — | 1.5 | 1.0 | 1.0 |
| Water-soluble organic solvent | Propylene glycol | 25 | 25 | 25 | 25 | 25 | 25 | 25 | 25 | 25 | 25 | 25 | 25 | 25 | 25 | 25 | 25 |
| | Water | 32 | 32 | 32 | 31 | 33 | 39 | 32 | 32 | 32 | 32 | 29.5 | 32 | 32 | 32 | 32 | 32 |
| | Total | 100 | 100 | 100 | 100 | 100 | 100 | 100 | 100 | 100 | 100 | 100 | 100 | 100 | 100 | 100 | 100 |
| | Preservation stability | ○ | ○ | ○ | ○ | ○ | ○ | ○ | ○ | ○ | ○ | X | X | Δ | ○ | X | X |
| | Dot expandability | ○ | ○ | ○ | ○ | ○ | ○ | ○ | ○ | ○ | ○ | Δ | ○ | Δ | X | Δ | Δ |
| | Solid area uniformity | ○ | ○ | ○ | ○ | ○ | ○ | ○ | ○ | ○ | ○ | ○ | Δ | Δ | Δ | ○ | ○ |

What is claimed is:

1. A water-based inkjet ink composition for printing on nonabsorbent base material that contains alkali-soluble resin-coated pigment, basic compound, water-soluble organic solvent, surface-active agent A, and surface-active agent B, wherein said water-based inkjet ink composition for printing on nonabsorbent base material is characterized in that surface-active agent A is an acetylene diol compound represented by Formula (1), the content of surface-active agent A in the water-based inkjet ink composition is 0.1 to 1 percent by mass, surface-active agent B is a compound with an HLB value of 4 to 9 obtained by adding an ethylene oxide to an acetylene diol compound, and the static surface tension of the ink composition is 27 to 32 mN/m, Formula (1)

$$H_3C-CH(CH_3)-CH_2-C(CH_3)(OH)-C\equiv C-C(CH_3)(OH)-CH_2-CH(CH_3)-CH_3$$

wherein the content of surface-active agent B in the water-based inkjet ink composition is 0.8 to 2.5 percent by mass, and the ratio of the content of surface-active agent A and that of surface-active agent B is in a range of 1.5 to 10 as calculated by "Content of surface-active agent B/Content of surface-active agent A".

2. A water-based inkjet ink composition for printing on nonabsorbent base material that contains alkali-soluble resin-coated pigment, basic compound, water-soluble organic solvent, surface-active agent A, and surface-active agent B, wherein said water-based inkjet ink composition for printing on nonabsorbent base material is characterized in that surface-active agent A is an acetylene diol compound represented by Formula (1), the content of surface-active agent A in the water-based inkjet ink composition is 0.1 to 1 percent by mass, surface-active agent B is a compound with an HLB value of 4 to 9 obtained by adding an ethylene oxide to an acetylene diol compound, the content of surface-active agent B in the water-based inkjet ink composition is 0.4 to 2.5 percent by mass, and the static surface tension of the ink composition is 27 to 32 mN/m,

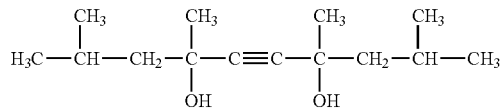

Formula (1)

wherein the water-based inkjet ink composition contains a resin emulsion of which a glass transition temperature is 20° C. or lower.

3. A water-based inkjet ink composition for printing on nonabsorbent base material that contains alkali-soluble resin-coated pigment, basic compound, water-soluble organic solvent, surface-active agent A, and surface-active agent B, wherein said water-based inkjet ink composition for printing on nonabsorbent base material is characterized in that surface-active agent A is an acetylene diol compound represented by Formula (1), the content of surface-active agent A in the water-based inkjet ink composition is 0.1 to 1 percent by mass, surface-active agent B is a compound with an HLB value of 4 to 9 obtained by adding an ethylene oxide to an acetylene diol compound, the content of surface-active agent B in the water-based inkjet ink composition is 0.4 to 2.5 percent by mass, and the static surface tension of the ink composition is 27 to 32 mN/m,

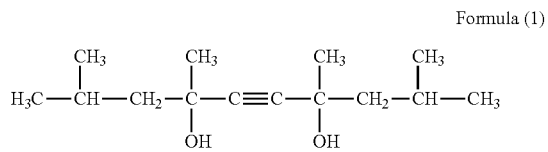 [SMILES: CC(C)CC(C)(O)C#CC(C)(O)CC(C)C]

Formula (1)

wherein the acid value of the alkali-soluble resin used for the alkali-soluble resin-coated pigment is 40 to 300 mgKOH/g, and the ink contains a basic compound needed to neutralize 50 to 90% of the acid groups in the resin.

4. The water-based inkjet ink composition for printing on nonabsorbent base material according to claim 1, characterized in that it contains a resin emulsion of which a glass transition temperature is 20° C. or lower.

5. The water-based inkjet ink composition for printing on nonabsorbent base material according to claim 1, characterized in that the acid value of the alkali-soluble resin used for the alkali-soluble resin-coated pigment is 40 to 300 mgKOH/g, and the ink contains a basic compound needed to neutralize 50 to 90% of the acid groups in the resin.

6. The water-based inkjet ink composition for printing on nonabsorbent base material according to claim 1, characterized in that the content of the water-soluble organic solvent in the water-based inkjet ink composition for printing on nonabsorbent base material is 20 to 40 percent by mass.

7. The water-based inkjet ink composition for printing on nonabsorbent base material according to claim 2, characterized in that the acid value of the alkali-soluble resin used for the alkali-soluble resin-coated pigment is 40 to 300 mgKOH/g, and the ink contains a basic compound needed to neutralize 50 to 90% of the acid groups in the resin.

8. The water-based inkjet ink composition for printing on nonabsorbent base material according to claim 2, characterized in that the content of the water-soluble organic solvent in the water-based inkjet ink composition for printing on nonabsorbent base material is 20 to 40 percent by mass.

9. The water-based inkjet ink composition for printing on nonabsorbent base material according to claim 3, characterized in that the content of the water-soluble organic solvent in the water-based inkjet ink composition for printing on nonabsorbent base material is 20 to 40 percent by mass.

10. The water-based inkjet ink composition for printing on nonabsorbent base material according to claim 4, characterized in that the acid value of the alkali-soluble resin used for the alkali-soluble resin-coated pigment is 40 to 300 mgKOH/g, and the ink contains a basic compound needed to neutralize 50 to 90% of the acid groups in the resin.

11. The water-based inkjet ink composition for printing on nonabsorbent base material according to claim 4, characterized in that the content of the water-soluble organic solvent in the water-based inkjet ink composition for printing on nonabsorbent base material is 20 to 40 percent by mass.

12. The water-based inkjet ink composition for printing on nonabsorbent base material according to claim 5, characterized in that the content of the water-soluble organic solvent in the water-based inkjet ink composition for printing on nonabsorbent base material is 20 to 40 percent by mass.

13. The water-based inkjet ink composition for printing on nonabsorbent base material according to claim 7, characterized in that the content of the water-soluble organic solvent in the water-based inkjet ink composition for printing on nonabsorbent base material is 20 to 40 percent by mass.

14. The water-based inkjet ink composition for printing on nonabsorbent base material according to claim 10, characterized in that the content of the water-soluble organic solvent in the water-based inkjet ink composition for printing on nonabsorbent base material is 20 to 40 percent by mass.

* * * * *

UNITED STATES PATENT AND TRADEMARK OFFICE
CERTIFICATE OF CORRECTION

Page 1 of 2

PATENT NO. : 10,301,494 B2
APPLICATION NO. : 15/550329
DATED : May 28, 2019
INVENTOR(S) : Yoichi Sato et al.

It is certified that error appears in the above-identified patent and that said Letters Patent is hereby corrected as shown below:

In the Specification

In Column 7, Line 40, change "propyplene" to --propylene--.

In Column 7, Line 55, change "s-caprolactone, s-caprolactam," to --ε-caprolactone, ε-caprolactam,--.

In Column 8, Line 9, change "Surfinol 104E, Surfinol 104H," to --Surfynol 104E, Surfynol 104H,--.

In Column 8, Line 10, change "Surfinol 104A, Surfinol 104BC, Surfinol 104DPM, Surfinol" to --Surfynol 104A, Surfynol 104BC, Surfynol 104DPM, Surfynol--.

In Column 8, Line 11, change "Surfinol" to --Surfynol--.

In Column 8, Lines 25-26, change "Surfinol 420, Surfinol" to --Surfynol 420, Surfynol--.

In Column 11, Line 11 (Approx.), change "Surfinol" to --Surfynol--.

In Column 11, Line 14 (Approx.), change "Surfinol" to --Surfynol--.

In Column 11, Line 16 (Approx.), change "Surfinol" to --Surfynol--.

In Column 11, Line 18 (Approx.), change "Surfinol" to --Surfynol--.

In Column 12, Line 51 (Approx.), change "Surfinol" to --Surfynol--.

In Column 12, Line 54 (Approx.), change "Surfinol" to --Surfynol--.

In Columns 13-14, Line 8 (Approx.) (TABLE 1-continued), change "Surfinol" to --Surfynol--.

Signed and Sealed this
Fifteenth Day of October, 2019

Andrei Iancu
*Director of the United States Patent and Trademark Office*

In Columns 13-14, Line 11 (Approx.) (TABLE 1-continued), change "Surfinol" to --Surfynol--.

In Columns 13-14, Line 12 (Approx.) (TABLE 1-continued), change "Surfinol" to --Surfynol--.

In Columns 13-14, Line 14 (Approx.) (TABLE 1-continued), change "Surfinol" to --Surfynol--.